United States Patent
Li

(10) Patent No.: US 12,520,306 B2
(45) Date of Patent: Jan. 6, 2026

(54) UPLINK CHANNEL TRANSMISSION METHOD AND APPARATUS, AND TERMINAL

(71) Applicant: VIVO MOBILE COMMUNICATION CO., LTD., Guangdong (CN)

(72) Inventor: Na Li, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 387 days.

(21) Appl. No.: 18/110,590

(22) Filed: Feb. 16, 2023

(65) Prior Publication Data
US 2023/0199761 A1  Jun. 22, 2023

Related U.S. Application Data

(63) Continuation of application No. PCT/CN2021/119279, filed on Sep. 18, 2021.

(30) Foreign Application Priority Data

Sep. 25, 2020 (CN) .......................... 202011025321.9

(51) Int. Cl.
*H04W 72/1268* (2023.01)
*H04W 72/21* (2023.01)
(Continued)

(52) U.S. Cl.
CPC ....... *H04W 72/1268* (2013.01); *H04W 72/21* (2023.01); *H04W 72/51* (2023.01); *H04W 72/566* (2023.01)

(58) Field of Classification Search
CPC . H04W 72/1268; H04W 72/21; H04W 72/51; H04W 72/566; H04W 72/563;
(Continued)

(56) References Cited

U.S. PATENT DOCUMENTS

2021/0007119 A1  1/2021  Li et al.
2021/0212085 A1  7/2021  Wu
(Continued)

FOREIGN PATENT DOCUMENTS

CN  109756979 A  5/2019
CN  110149705 A  8/2019
(Continued)

OTHER PUBLICATIONS

LG Electronics "UCI enhancements for NR URLLC" 3GPP TSG RAN WG1 #98bis, Chongqing, China, Oct. 2019, R1-1910827, 7 Pages. (Year: 2019).*

(Continued)

*Primary Examiner* — Thinh D Tran
(74) *Attorney, Agent, or Firm* — BROOKS KUSHMAN P.C.

(57) ABSTRACT

An uplink channel transmission method and apparatus and a terminal. The uplink channel transmission method includes: in a case of uplink channel overlapping in time domain resource, handling, by a terminal, the overlapping between uplink channels according to a preset rule; and transmitting, by the terminal, overlap-handled uplink channels, where the uplink channels overlapping in time domain resource include uplink channels of different priorities, and the preset rule is associated with at least one of the following: priority of uplink channel, type of uplink channel, starting time of uplink channel, configuration of uplink channel, capability of the terminal, or configuration information transmitted by a network-side device, where the configuration information is used to indicate an order of handling overlapping of uplink channel transmissions.

16 Claims, 4 Drawing Sheets

(51) Int. Cl.
*H04W 72/51* (2023.01)
*H04W 72/566* (2023.01)

(58) Field of Classification Search
CPC .......... H04W 72/569; H04L 1/18; H04L 5/00; H04L 1/1887; H04L 1/1893; H04L 5/0053
See application file for complete search history.

(56) References Cited

U.S. PATENT DOCUMENTS

| | | | | |
|---|---|---|---|---|
| 2022/0061071 | A1 | 2/2022 | Zhou et al. | |
| 2022/0150005 | A1 | 5/2022 | Zhang et al. | |
| 2022/0248410 | A1* | 8/2022 | Lee | H04L 5/0064 |
| 2022/0279538 | A1* | 9/2022 | Jung | H04W 72/1268 |
| 2023/0254105 | A1* | 8/2023 | Wong | H04L 5/0053 370/281 |
| 2023/0345472 | A1* | 10/2023 | Takahashi | H04W 72/21 |

FOREIGN PATENT DOCUMENTS

| | | |
|---|---|---|
| CN | 110933763 A | 3/2020 |
| CN | 111372316 A | 7/2020 |
| CN | 111601388 A | 8/2020 |
| CN | 111642001 A | 9/2020 |
| CN | 113225811 A | 8/2021 |
| WO | 2019154357 A1 | 8/2019 |
| WO | 2020134681 A1 | 7/2020 |

OTHER PUBLICATIONS

Ericsson, "UCI Enhancements for NR URLLC", 3GPP TSG RAN WG1 Meeting #98bis, R1-1910546, Chongqing, China, Oct. 14-20, 2019 (Year: 2019).*

Oppo, "UCI enhancements for URLLC", 3GPP TSG RAN WG1 #98bis, R1-1910620, Chongqing, China, Oct. 14-20, 2019 (Year: 2019).*

International Search Report and Written Opinion for Application No. PCT/CN2021/119279, dated Nov. 22, 2021, 10 Pages.

First Office Action for Japanese Application No. 2023-519137, dated Mar. 5, 2024, 4 Pages.

LG Electronics "UCI enhancements for NR URLLC" 3GPP TSG RAN WG1 #98bis, Chongqing, China, Oct. 2019, R1-1910827, 7 Pages.

* cited by examiner

UPLINK CHANNEL TRANSMISSION METHOD AND APPARATUS, AND TERMINAL

CROSS-REFERENCE TO RELATED APPLICATIONS

This application is a continuation of International Application No. PCT/CN2021/119279 filed on Sep. 18, 2021, which claims priority to Chinese Patent Application No. 202011025321.9, filed on Sep. 25, 2020, which are incorporated herein by reference in their entireties.

TECHNICAL FIELD

This application pertains to the field of communication technologies, and specifically, relates to an uplink channel transmission method and apparatus, and a terminal.

BACKGROUND

In some communication systems (for example, New Radio (NR) system), different channels may have different starting symbols and lengths, and thus transmission resources may overlap in time domain. However, when multiple overlapping uplink channels are transmitted in one slot, the single-carrier characteristic of terminals may be destroyed, and different transmit powers may deteriorate channel performance, causing poor uplink channel transmission performance.

SUMMARY

According to a first aspect, an uplink channel transmission method is provided, where the method includes:
- in a case of uplink channel overlapping in time domain resource, handling, by a terminal, the overlapping between uplink channels according to a preset rule; and
- transmitting, by the terminal, overlap-handled uplink channels; where,
- the uplink channels overlapping in time domain resource include uplink channels of different priorities, and the preset rule is associated with at least one of the following:
- priority of uplink channel;
- type of uplink channel;
- starting time of uplink channel;
- configuration of uplink channel;
- capability of the terminal; or
- configuration information transmitted by a network-side device, where the configuration information is used to indicate an order of handling overlapping of uplink channel transmissions.

According to a second aspect, an uplink channel transmission apparatus is provided, including:
- a handling module, configured to: in a case of uplink channel overlapping in time domain resource, handle the overlapping between uplink channels according to a preset rule; and
- a transmitting module, configured to transmit overlap-handled uplink channels; where,
- the uplink channels overlapping in time domain resource include uplink channels of different priorities, and the preset rule is associated with at least one of the following:
- priority of uplink channel;
- type of uplink channel;
- starting time of uplink channel;
- configuration of uplink channel;
- capability of the uplink channel transmission apparatus; or
- configuration information transmitted by a network-side device, where the configuration information is used to indicate an order of handling overlapping of uplink channel transmissions.

According to a third aspect, a terminal is provided, where the terminal includes: a processor, a memory, and a program or instructions stored in the memory and capable of running on the processor, where when the program or instructions are executed by the processor, the steps of the uplink channel transmission method according to the first aspect are implemented.

According to a fourth aspect, a readable storage medium is provided, where the readable storage medium stores a program or instructions, and when the program or instructions are executed by a processor, the steps of the uplink channel transmission method according to the first aspect are implemented.

According to a fifth aspect, a chip is provided, where the chip includes a processor and a communication interface, the communication interface is coupled to the processor, and the processor is configured to run a program or instructions of a network-side device to implement the steps of the uplink channel transmission method according to the first aspect.

DETAILED DESCRIPTION

The following clearly describes the technical solutions in the embodiments of this application with reference to the accompanying drawings in the embodiments of this application. Apparently, the described embodiments are some but not all of the embodiments of this application. All other embodiments obtained by persons of ordinary skill in the art based on the embodiments of this application without creative efforts shall fall within the protection scope of this application.

The terms "first", "second", and the like in this specification and claims of this application are used to distinguish between similar objects rather than to describe a specific order or sequence. It should be understood that the terms used in this way are interchangeable in appropriate circumstances such that the embodiments of this application described herein can be implemented in other orders than the order illustrated or described herein, and objects distinguished by "first" and "second" are generally of a same type and the object quantities are not limited. For example, there may be one or more first objects. In addition, in this specification and claims, "and/or" indicates at least one of connected objects, and the character "/" generally indicates an "or" relationship between associated objects.

It should be noted that the technologies described in the embodiments of this application are not limited to long term evolution (LTE)/LTE-Advanced (LTE-A) systems, but may also be used in other wireless communication systems, such as code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" as used in the embodiments of this application may be used interchangeably and the technology described may be used in the above-mentioned systems and radio technologies as well as other systems and radio technologies. However, in the following descriptions, a new radio system is described for illustrative purposes, and NR terms are used in most of the following descriptions, although these technologies may also be applied to other applications than the NR system application, for example, 6th generation (6G) communication systems.

Figure 1:
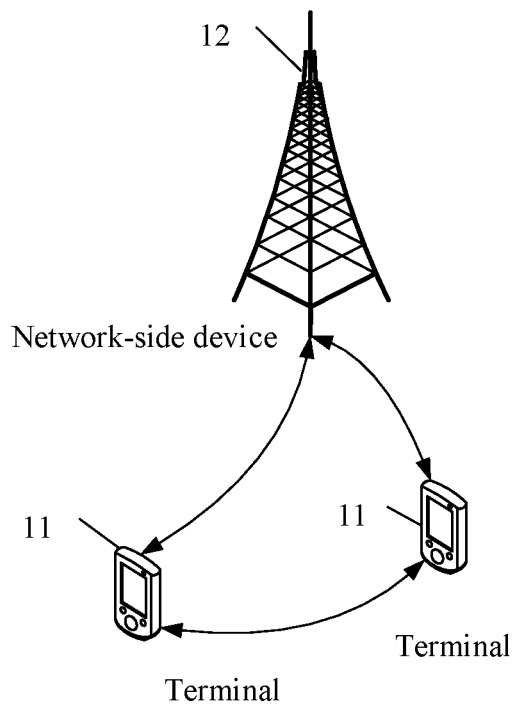
FIG. 1 is a block diagram of a wireless communication system to which embodiments of this application are applicable.

FIG. 1 is a block diagram of a wireless communication system to which embodiments of this application are applicable. The wireless communication system includes a terminal 11 and a network-side device 12. The terminal 11 may also be referred to as a terminal device or user equipment (UE). The terminal 11 may be a terminal-side device such as a mobile phone, a tablet personal computer, a laptop computer or notebook computer, a personal digital assistant (PDA), a palmtop computer, a netbook, an ultra-mobile personal computer (UMPC), a mobile internet device (MID), a wearable device, vehicular user equipment (VUE), or pedestrian user equipment (PUE). The wearable device includes wristbands, earphones, glasses, and the like. It should be noted that the terminal 11 is not limited to any specific type in the embodiments of this application. The network-side device 12 may be a base station or a core network, where the base station may be referred to as a NodeB, an evolved NodeB, an access point, a base transceiver station (BTS), a radio base station, a radio transceiver, a basic service set (BSS), an extended service set (ESS), a Node B, an evolved node B (eNB), a home NodeB, a home evolved NodeB, a WLAN access point, a Wi-Fi node, a transmitting receiving point (TRP), or some other appropriate term in the art. As long as the same technical effects are achieved, the base station is not limited to any specific technical term. It should be noted that the base station in the NR system is taken only as an example in the embodiments of this application, and the base station is not limited to any specific type.

The following specifically describes the uplink channel transmission method and apparatus and the electronic device provided in the embodiments of this application through specific embodiments and application scenarios thereof with reference to the accompanying drawings.

Figure 2:
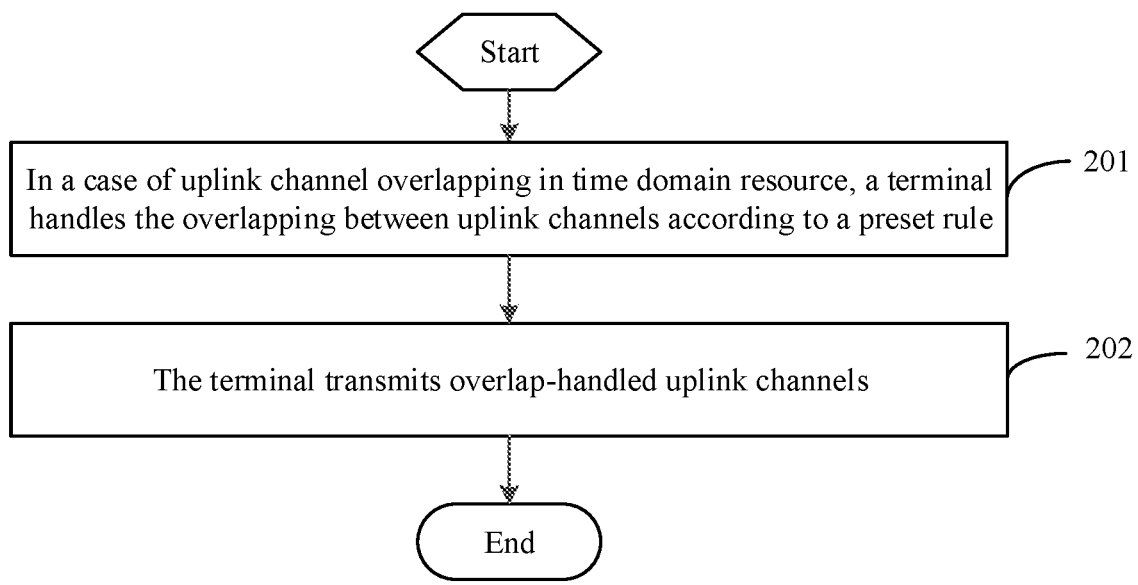
FIG. 2 is a flowchart of an uplink channel transmission method according to an embodiment of this application.

Refer to FIG. 2, which is a flowchart of an uplink channel transmission method according to an embodiment of this application. The uplink channel transmission method is applied to a terminal. As shown in FIG. 2, the uplink channel transmission method includes the following steps.

Step 201. In a case of uplink channel overlapping in time domain resource, a terminal handles the overlapping between uplink channels according to a preset rule.

The uplink channels overlapping in time domain resource include uplink channels of different priorities. It can be understood that the terminal may support different services, and different services correspond to different service requirements, for example, for uplink channel latency and reliability, and accordingly uplink channels can be prioritized. Optionally, priorities of uplink channels may include a high priority and a low priority. The priority may be represented by a priority index. For example, a priority index 1 represents a high priority, and a priority index 0 represents a low priority.

It should be noted that priorities of different uplink channels may be obtained in different ways. For example, for scheduling request (SR), physical uplink shared channel (PUSCH) scheduled by configured grant (CG), semi-persistent-scheduling (SPS) physical downlink shared channel (PDSCH), and release hybrid automatic repeat request acknowledgement (HARQ-ACK), their priorities are configured by radio resource control (RRC) signaling; and persistent channel state information (P-CSI) or semi-persistent channel state information (Semi-Persistent CSI, SP-CSI) on physical uplink control channel (PUCCH) may be deemed as information of a low priority, as is predefined. For HARQ-ACK for PDSCH dynamically scheduled, PUSCH dynamically scheduled, and aperiodic CSI (A-CSI) or SP-CSI on PUSCH, their priorities may be indicated by a 1-bit field in corresponding downlink control information (DCI) for scheduling, or may be obtained in an implicit way, for example, from a DCI format. Priority of a PUCCH may be determined by HARQ-ACK, SR, or CSI carried on the PUCCH.

Optionally, in a case of multiplexing of channels of different priorities, the priority of a channel multiplexing UCI of a different priority may be determined by a higher priority of the priority of the multiplexed UCI and an original priority of the channel, or remains unchanged. For example, if PUCCH or PUSCH of a lower priority multiplexing UCI of a higher priority, the PUCCH or PUSCH may be of the higher priority or may still be of the lower priority.

It should be noted that uplink transmission channels in the present application, such as PUCCH or PUSCH, are uplink transmission channels in a PUCCH group or cell group.

It should be noted that uplink channel overlapping in time domain resource may also be referred to as uplink channel time domain resource collision, or uplink channel resource collision, or uplink channel collision.

In the embodiment of this application, in the case of uplink channel overlapping in time domain resource, the overlapping between uplink channels needs to be handled first. Specifically, the terminal can handle the overlapping between uplink channels according to a preset rule. The preset rule is associated with at least one of the following:
priority of uplink channel;
type of uplink channel;
starting time of uplink channel;
configuration of uplink channel;
capability of the terminal; or
configuration information transmitted by a network-side device, where the configuration information is used to indicate an order of handling overlapping of uplink channel transmissions.

As such, in the case of uplink channel overlapping in time domain resource, the terminal can handle the overlapping between uplink channels according to at least one of the foregoing six preset rules. The preset rules are described in detail through the following different implementations.

Optionally, in a case that the preset rule is associated with the priority of uplink channel, the handling the overlapping between uplink channels according to a preset rule includes:

handling preferentially overlapping between uplink channels of a same priority and handling later overlapping between uplink channels of different priorities.

It can be understood that uplink channels overlapping in time domain resource include uplink channels of different priorities, for example, uplink channels of a high priority and uplink channels of a low priority, and the terminal can handle preferentially overlapping between uplink channels of a high priority or overlapping between uplink channels of a low priority, and handle later overlapping between uplink channels of different priorities. For example, the terminal handles preferentially overlapping between uplink channels of a high priority (if any) or overlapping between uplink channels of a low priority (if any), and handles later overlapping between an uplink channel of a high priority and an uplink channel of a low priority.

The handling preferentially overlapping between uplink channels of a same priority includes:

handling preferentially overlapping between PUCCHs of a same priority and handling later overlapping between PUCCH and PUSCH of a same priority.

Therefore, for overlapping between uplink channels of a same priority, the terminal can further handle the overlapping between uplink channels according to different types of the uplink channels. For example, in a case that the uplink channels overlapping in time domain resource include uplink channels of different priorities, the terminal handles preferentially overlapping between PUCCHs of a same priority (if any), handles later overlapping between PUCCH and PUSCH of a same priority (if any), and handles even later overlapping between uplink channels different priorities.

It should be noted that the handling of overlapping between channels of different types and/or different priorities in the embodiments of this application is performed according to the preset rule provided in the embodiments of this application, on a basis that the channels of these types and/or priorities exist and overlapping has occurred between the channels. However, in some cases, channels of some types or priorities do not exist or no overlapping has occurred. In a case that no channel related to the preset rule in the embodiments of this application exists, instead of performing an operation corresponding to such channel, the terminal just needs to perform handling according to the specific channel overlapping condition. For example, for overlapping between uplink channels of a same priority, if overlapping exists only between PUCCH and PUSCH of a same priority rather than exists between PUCCHs of a same priority, the terminal handles preferentially the overlapping between PUCCH and PUSCH of a same priority. For handling of overlapping between channels in the following implementations, the terminal similarly only needs to perform handling according to a specific condition of existent overlapping between channels, without considering channels without overlapping. To avoid repetition, details are not described in the following again.

The handling later overlapping between uplink channels of different priorities includes:

handling preferentially overlapping between PUCCHs of different priorities and handling later overlapping between PUCCH and PUSCH of different priorities.

That is, for overlapping between uplink channels of different priorities, the terminal can similarly further handle the overlapping between uplink channels according to different types of the uplink channels. For example, after handling the overlapping between uplink channels of a same priority, for the overlapping between uplink channels of different priorities, the terminal handles preferentially the overlapping between PUCCHs of different priorities, and handles later the overlapping between PUCCH and PUSCH of different priorities.

In a specific implementation, in a case that PUCCH and PUSCH include low-priority uplink transmissions and high-priority uplink transmissions and that overlapping is existent, the terminal handles preferentially the overlapping between PUCCHs of a same priority, handles later the overlapping between PUCCH and PUSCH of a same priority, handles even later the overlapping between PUCCHs of different priorities, and handles yet even later the overlapping between PUCCH and PUSCH of different priorities.

It can be understood that in the foregoing implementations, in the case that the uplink channels overlapping in time domain resource include uplink channels of different priorities, the terminal can handle the overlapping between uplink channels according to priorities of the uplink channels and then transmit the overlap-handled uplink channels.

Optionally, in a case that the preset rule is associated with the priority of uplink channel and the type of uplink channel, the handling the overlapping between uplink channels according to a preset rule includes:

handling preferentially overlapping between PUCCHs of a same priority, handling later overlapping between PUCCHs of different priorities, and handling even later overlapping between PUCCH and PUSCH of a same priority; or handling preferentially overlapping between PUCCHs of a same priority, handling later overlapping between PUCCHs of different priorities, and handling even later overlapping between PUCCH and PUSCH of different priorities; or handling preferentially overlapping between PUCCHs of a same priority, handling later overlapping between PUCCHs of different priorities, and handling even later overlapping between PUCCH and PUSCH.

That is, in a case that PUCCH and PUSCH include low-priority uplink transmissions and high-priority uplink transmissions, for uplink channels overlapping in time domain resource, the overlapping between uplink channels can be handled according to the priority of uplink channel and the type of uplink channel.

In this implementation, according to the type of uplink channel, the overlapping between PUCCHs is preferentially handled, and the overlapping between PUCCH and PUSCH is later handled. In a case that uplink channels are of a same type, overlapping between uplink channels is handled according to the priority of uplink channel. For example, overlapping between PUCCHs of a same priority is preferentially handled and overlapping between PUCCHs of different priorities is later handled.

The overlapping between PUCCH and PUSCH being later handled may be overlapping between PUCCH and PUSCH of a same priority being later handled, or overlapping between PUCCH and PUSCH of different priorities being later handled, or regardless of whether PUCCH and PUSCH are of a same priority or different priorities, overlapping between PUCCH and PUSCH being later handled after overlapping between PUCCHs is preferentially handled.

In this implementation, the terminal can handle the overlapping between uplink channels according to the type of uplink channel and the priority of uplink channel. In this way, the terminal can effectively handle in order the overlapping between uplink channels, guaranteeing uplink channel transmission performance.

Optionally, in a case that the preset rule is associated with the type of uplink channel, the handling the overlapping between uplink channels according to a preset rule includes:

handling preferentially overlapping between PUCCHs and handling later overlapping between PUCCH and PUSCH.

In this implementation, in the case of uplink channel overlapping in time domain resource, the terminal handles preferentially overlapping between PUCCHs (regardless of whether the PUCCHs are of a same priority or different priorities), and handles later overlapping between PUCCH and PUSCH (regardless of whether the PUCCH and PUSCH are of a same priority or different priorities). In this way, overlapping between uplink channels can handled according to the type of uplink channel, without distinguishing between priorities of the uplink channels, which simplifies handling of overlapping between uplink channels, thereby ensuring efficient uplink channel overlapping handling by the terminal.

Optionally, in a case that the preset rule is associated with the starting time of uplink channel, the handling the overlapping between uplink channels according to a preset rule includes:

handling preferentially overlapping between uplink channels of earlier starting time and handling later overlapping between uplink channels of later starting time.

The starting time includes a starting symbol and/or starting time unit of uplink channel. For example, the starting time is a starting time unit of uplink channel. In the case of uplink channel overlapping in time domain resource, the terminal handles preferentially overlapping between uplink channels with an earlier starting time unit and handles later overlapping between uplink channels with a later starting time unit. Alternatively, the starting time is a starting symbol of uplink channel. In this case, the terminal handles preferentially overlapping between uplink channels with an earlier starting symbol and handles later overlapping between uplink channels with a later starting symbol.

In this implementation, the order of handling overlapping between uplink channels is determined according to the starting time of uplink channel, that is, overlapping is handled according to the order of uplink channel starting time, simplifying handling of overlapping between uplink channels.

Optionally, in a case that the preset rule is associated with the configuration of uplink channel, the handling the overlapping between uplink channels according to a preset rule includes:

handling preferentially overlapping between configured uplink channels and handling later overlapping between configured uplink channel and dynamically scheduled uplink channel; or handling preferentially overlapping between configured uplink channels and handling later overlapping between dynamically scheduled uplink channels.

That is, in the case of uplink channel overlapping in time domain resource, the terminal handles preferentially overlapping between configured uplink channels, and handles later overlapping between dynamically scheduled uplink channels or handles later overlapping between configured uplink channel and dynamically scheduled uplink channel. In this implementation, the terminal can handle the overlapping between uplink channels according to the configuration of uplink channel. As configured uplink transmission is independent of dynamic scheduling, the UE can handle overlapping between configured uplink channels without relying on dynamic scheduling, simplifying the handling of overlapping between uplink channels.

Optionally, in the case of uplink channel overlapping in time domain resource, the terminal can handle the overlapping between uplink channels according to the capability of the terminal. The capability of the terminal determines an order for the terminal to handle overlapping between uplink channels in time domain resource. Alternatively, the terminal can handle the overlapping between uplink channels according to the configuration information transmitted by the network-side device. The configuration information is used to indicate an order of handling uplink channel overlapping. For example, the configuration information may indicate that the terminal handles preferentially overlapping between PUCCHs and handles later overlapping between PUCCH and PUSCH, and accordingly the terminal handles the overlapping between uplink channels according to the handling order indicated by the configuration information.

In an embodiment of this application, the handling the overlapping between uplink channels includes at least one of the following:

in a case of overlapping between PUCCHs, multiplexing the overlapping PUCCHs onto one PUCCH; or in a case of overlapping between PUCCH and PUSCH, multiplexing at least part of uplink control information (UCI) carried on each of the PUCCH onto at least one of the PUSCH.

In a case of overlapping between PUCCHs, the overlapping PUCCHs can be multiplexed onto a first PUCCH, where the first PUCCH may be any one of the overlapping PUCCHs; or the overlapping PUCCHs can be multiplexed onto a third PUCCH, where the third PUCCH is a PUCCH other than the first PUCCH and a second PUCCH. For example, uplink channels transmitted by the terminal include a first PUCCH and a second PUCCH. In a case that the first PUCCH and the second PUCCH overlap in time domain resource, the first PUCCH is multiplexed onto the second PUCCH, or the second PUCCH is multiplexed onto the first PUCCH, or both the first PUCCH and the second PUCCH are multiplexed onto a third PUCCH. The third PUCCH is a PUCCH resource determined according to a quantity of bits of multiplexed UCI or is a PUCCH resource configured for transmitting multiplexed UCI. In this way, the overlapping PUCCHs are handled, avoiding destroying the single-carrier characteristic of the terminal and guaranteeing uplink channel transmission performance.

In a case of overlapping between PUCCH and PUSCH, UCI carried on the PUCCH is all multiplexed onto at least one PUSCH or partly multiplexed onto at least one PUSCH. For example, if the UCI includes HARQ-ACK, CSI, and SR, the UE can multiplex the HARQ-ACK and CSI onto PUSCH and drop the SR. For another example, if both high-priority HARQ-ACK and low-priority HARQ-ACK are included, the UE can compress the low-priority HARQ-ACK into one with fewer bits and multiplex the compressed HARQ-ACK and the high-priority HARQ-ACK onto one PUSCH. Optionally, if PUCCH overlaps with only one PUSCH, UCI carried on the PUCCH is all multiplexed onto the PUSCH or partly multiplexed onto the PUSCH; if PUCCH overlaps with multiple PUSCHs, the terminal can select one from the PUSCHs for multiplexing. For example, the terminal can select a PUSCH having A-CSI for multiplexing; or select a PUSCH with an earliest starting slot for multiplexing; or in a case that PUSCH dynamically scheduled and PUSCH scheduled by a configured grant are included, select preferentially the PUSCH dynamically scheduled, for multiplexing; or select preferentially PUSCH transmitted earlier, for multiplexing; or select preferentially PUSCH in a serving cell with a small index, for multiplexing.

Alternatively, if the uplink channels overlapping in time domain resource are of different priorities, the terminal may drop low-priority (Low Priority, LP) uplink channels in handing the overlapping between uplink channels, and accordingly the terminal transmits only high-priority (High Priority, HP) uplink channels. In addition, for high-priority channels remaining after the terminal drops the low-priority uplink channels, the terminal can alternatively handle overlapping between the high-priority channels according to the foregoing preset rule. For example, in a case of overlapping between HP HARQ-ACK and HP PUSCH, the HP HARQ-ACK is multiplexed onto the HP PUSCH.

Alternatively, for overlapping between PUCCHs, the UE can determine, according to PUCCH formats or types of UCI carried, whether to multiplex the UCIs onto one channel or drop part of the UCI information. For example, if a PUCCH carrying the HARQ-ACK is in PUCCH format 1, a PUCCH carrying SR is in PUCCH format 0, and the two PUCCHs overlap in time domain resource, the UE drops the SR and transmits only the HARQ-ACK PUCCH.

In this way, overlapping uplink channels are multiplexed or dropped to avoid destroying the single-carrier characteristic of the terminal and reduce impact on service priorities, thereby guaranteeing uplink channel transmission performance.

Step 202. The terminal transmits overlap-handled uplink channels.

It can be understood that after the overlapping between uplink channels is handled according to the preset rule, the overlap-handled uplink channels are transmitted. In this way, the overlap-handled uplink channels include no overlapping uplink channels, guaranteeing the single-carrier characteristic of the terminal and avoiding degrading uplink channel transmission performance, thereby ensuring good uplink channel transmission performance of the terminal.

For better understanding the solution provided in this application, the following describes the uplink channel transmission method provided in this application by using specific embodiments.

Embodiment 1

Figure 3:
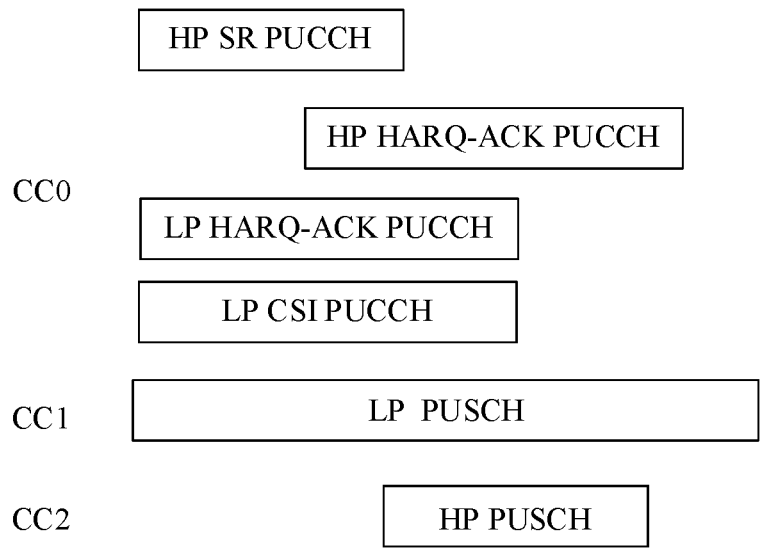
FIG. 3 is a schematic diagram of an uplink channel transmission scenario.

Refer to FIG. 3, which is a schematic diagram of an uplink channel transmission scenario. As shown in FIG. 3, in a given time unit, PUCCH and PUSCH of different priorities overlap in time domain resource, specifically including HP (high priority) SR PUCCH, HP HARQ-ACK PUCCH, LP (low priority) HARQ-ACK PUCCH, LP CSI PUCCH, LP PUSCH, and HP PUSCH. The PUCCH (including the HP SR PUCCH, HP HARQ-ACK PUCCH, LP HARQ-ACK PUCCH, and LP CSI PUCCH) is on component carrier (CC) CC0, the LP PUSCH is on CC1, and the HP PUSCH is on CC2. The terminal can use any one of the following manners to handle the overlapping between PUCCH and PUSCH of different priorities in time domain resource shown in FIG. 3.

Manner 1:
The terminal handles preferentially overlapping between PUCCHs of a same priority,
handles later overlapping between PUCCH and PUSCH of a same priority, handles even later overlapping between PUCCHs of different priorities, and handles at last overlapping between PUCCH and PUSCH of different priorities.

In FIG. 3, the HP SR PUCCH, HP HARQ-ACK PUCCH, and HP PUSCH are of a same priority (namely, high priority), and the LP HARQ-ACK PUCCH, LP CSI PUCCH, and LP PUSCH are of a same priority (namely, low priority). For overlapping between the HP SR PUCCH, the HP HARQ-ACK PUCCH, and the HP PUSCH, the terminal can multiplex the HP SR PUCCH onto the HP HARQ-ACK PUCCH; because the HP HARQ-ACK PUCCH and the HP PUSCH overlap in time domain resource, multiplex the HP HARQ-ACK onto the HP PUSCH, and drop HP SR (assuming that the HP PUSCH includes an uplink shared channel (UL-SCH)). For overlapping between the LP HARQ-ACK PUCCH, the LP CSI PUCCH, and the LP PUSCH, the terminal can firstly multiplex the LP HARQ-ACK PUCCH onto one PUCCH resource, for example, a PUCCH resource determined according to the number of bits of HARQ-ACK and CSI that are multiplexed. After multiplexing, if the resulting PUCCH resource still overlaps with the LP PUSCH in time domain resource, the terminal multiplexes the LP HARQ-ACK and the LP CSI onto the LP PUSCH for transmission (assuming that there is no CSI on the LP PUSCH). The LP PUSCH and the HP PUSCH are on different serving cells, and therefore the terminal separately transmits the LP PUSCH and the HP PUSCH that are with UCI multiplexed.

In this implementation, UCI of different priorities can be multiplexed onto different PUSCHs for transmission, reducing impact of multiplexing low-priority UCI onto high-priority PUSCH on transmission performance of the high-priority PUSCH, and reducing impact of multiplexing high-priority UCI onto high-priority PUSCH on transmission latency of the high-priority UCI, thereby better guaranteeing uplink transmission performance of the terminal.

Manner 2:
The terminal can handle preferentially overlapping between PUCCHs of a same priority, handle later overlapping between PUCCHs of different priorities, and handle even later overlapping between PUCCH and PUSCH (regardless of a same priority or different priorities).

Uplink channel overlapping in FIG. 3 is handled as follows. For overlapping between the HP SR PUCCH and the HP HARQ-ACK PUCCH, the terminal can multiplex the HP SR PUCCH onto the HP HARQ-ACK PUCCH. For overlapping between the LP HARQ-ACK PUCCH and the LP CSI PUCCH, the terminal can multiplex the LP HARQ-ACK PUCCH onto one PUCCH, for example, onto the LP CSI PUCCH. Then the terminal handles overlapping between uplink channels of different priorities. As the LP CSI PUCCH and the HP HARQ-ACK PUCCH overlap in time domain resource, the terminal can multiplex the LP CSI PUCCH and the HP HARQ-ACK PUCCH onto one channel. To be specific, the terminal can multiplex the HP SR PUCCH, the HP HARQ-ACK PUCCH, the LP HARQ-ACK PUCCH, and the LP CSI PUCCH onto one channel. After multiplexing, if the resulting PUCCH overlaps with the LP PUSCH or the HP PUSCH in time domain resource, UCIs of different priorities (including the HP SR PUCCH, the HP HARQ-ACK PUCCH, the LP HARQ-ACK PUCCH, and the LP CSI PUCCH) are multiplexed onto the LP PUSCH or the HP PUSCH. Optionally, the terminal can alternatively multiplex part of UCIs in HP SR, HP HARQ-ACK, LP HARQ-ACK, and LP CSI onto the LP PUSCH or the HP PUSCH. For example, the terminal multiplexes the HP HARQ-ACK and the LP HARQ-ACK onto the HP PUSCH and drops the HP SR and the LP CSI.

In this implementation, UCIs of different priorities can be multiplexed onto a same PUSCH. In a power restrained scenario, transmission of that PUSCH on which the UCIs have been multiplexed can be guaranteed preferentially so as to guarantee uplink transmission performance of the terminal, thus ensuring smooth communication.

Manner 3:

The terminal can handle preferentially overlapping between PUCCHs (regardless of a same priority or different priorities), and handle later overlapping between PUCCH and PUSCH (regardless of a same priority or different priorities).

For overlapping between uplink channels in FIG. 3, the terminal handles preferentially overlapping between the HP SR PUCCH, the HP HARQ-ACK PUCCH, the LP HARQ-ACK PUCCH, and the LP CSI PUCCH. For example, the terminal multiplexes different UCIs onto one PUCCH, such as the LP CSI PUCCH; or the terminal multiplexes HP SR, HP HARQ-ACK, and LP HARQ-ACK onto one PUCCH, and drops LP CSI. After multiplexing, if the resulting PUCCH channel overlaps with the LP PUSCH or the HP PUSCH, the UE multiplexes all or part of UCIs carried on the resulting PUCCH (which is the channel multiplexing all or part of UCIs in HP SR, HP HARQ-ACK, LP HARQ-ACK, and LP CSI) onto the LP PUSCH or the HP PUSCH. Optionally, the terminal can alternatively multiplex part of UCIs in HP SR, HP HARQ-ACK, LP HARQ-ACK, and LP CSI onto the LP PUSCH or the HP PUSCH.

In this implementation, overlapping between uplink channels is handled according to the type of uplink channel. In handling the overlapping between uplink channels, the terminal just needs to determine a handling order according to the type of uplink channel without considering the priorities of uplink channels, which simplifies the handling procedure of the terminal.

Manner 4:

The terminal can handle overlapping according to starting time (starting symbol and/or starting time unit) of PUCCH and PUSCH.

For overlapping between uplink channels in FIG. 3, the LP PUSCH, the HP SR PUCCH, the LP HARQ-ACK PUCCH, and the LP CSI PUCCH are uplink channels with earlier starting time, and the HP PUSCH and the HP HARQ-ACK PUCCH are uplink channels with later starting time. The terminal can handle preferentially overlapping between the LP PUSCH, the HP SR PUCCH, the LP HARQ-ACK PUCCH, and the LP CSI PUCCH. For example, the terminal multiplexes the HP SR PUCCH, the LP HARQ-ACK PUCCH, and the LP CSI PUCCH onto the LP PUSCH, or drops the HP SR PUCCH, or drops the LP PUSCH. It is assumed that the terminal multiplexes the HP SR PUCCH, the LP HARQ-ACK PUCCH, and the LP CSI PUCCH onto the LP PUSCH and then handles overlapping between the HP PUSCH and the HP HARQ-ACK PUCCH, for example, multiplexing the HP HARQ-ACK onto the HP PUSCH.

Manner 5:

The terminal can handle preferentially overlapping between configured uplink channels, and handle later overlapping between configured and dynamically scheduled uplink channels or handle later overlapping between dynamically scheduled uplink channels.

In FIG. 3, only the HP SR PUCCH and the LP CSI PUCCH are configured uplink channels, and the rest are all scheduled uplink channels. The terminal handles preferentially overlapping between the HP SR PUCCH and the LP CSI PUCCH, for example, multiplexing the HP SR PUCCH and the LP CSI PUCCH in a way, for example, multiplexing the HP SR PUCCH onto the LP CSI PUCCH, or dropping the LP CSI PUCCH; and then handles overlapping between other channels.

Embodiment 2

Figure 4:
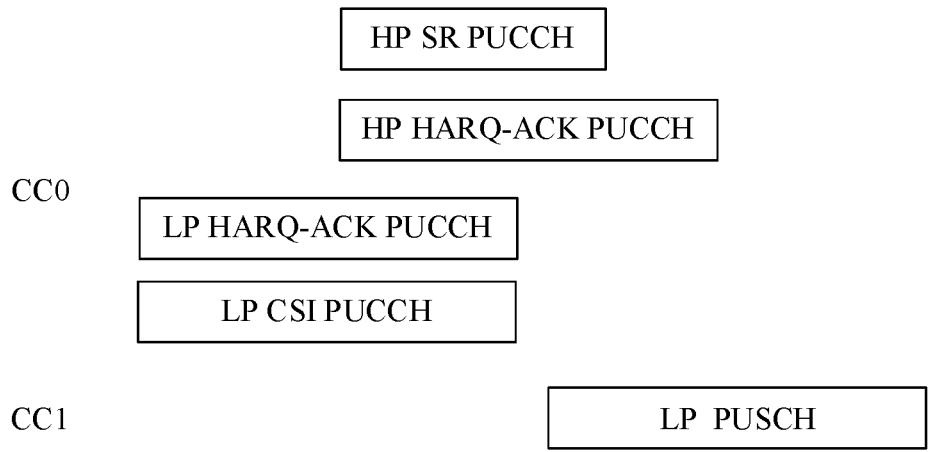
FIG. 4 is a schematic diagram of another uplink channel transmission scenario.

Refer to FIG. 4, which is a schematic diagram of another uplink channel transmission scenario. As shown in FIG. 4, in a given time unit, PUCCH and PUSCH of different priorities overlap in time domain resource, specifically including HP SR PUCCH, HP HARQ-ACK PUCCH, LP HARQ-ACK PUCCH, LP CSI PUCCH, and LP PUSCH. The PUCCHs (including the HP SR PUCCH, HP HARQ-ACK PUCCH, LP HARQ-ACK PUCCH, and LP CSI PUCCH) are on CC0, and the LP PUSCH is on CC1. The terminal can use any one of the following manners to handle the overlapping in time domain resource between PUCCH and PUSCH of different priorities shown in FIG. 4.

The terminal handles preferentially overlapping between PUCCHs of a same priority, handles later overlapping between PUCCH and PUSCH of a same priority, handles even later overlapping between PUCCHs of different priorities, and handles at last overlapping between PUCCH and PUSCH of different priorities.

In FIG. 4, the terminal handles preferentially overlapping between the HP SR PUCCH and the HP HARQ-ACK PUCCH and overlapping between the LP HARQ-ACK PUCCH and the LP CSI PUCCH: for the overlapping between the HP SR PUCCH and the HP HARQ-ACK PUCCH, the terminal can multiplex the HP SR PUCCH onto the HP HARQ-ACK PUCCH, and for the overlapping between the LP HARQ-ACK PUCCH and the LP CSI PUCCH, the terminal can multiplex the LP HARQ-ACK PUCCH onto one PUCCH, for example, onto the LP CSI PUCCH. Then, the terminal handles overlapping between uplink channels of different priorities. As the HP HARQ-ACK PUCCH and the LP CSI PUCCH overlap in time domain resource, the terminal can multiplex UCIs carried on the two PUCCHs, for example, multiplexing HP SR, HP HARQ-ACK, LP HARQ-ACK, and LP CSI onto one PUCCH. After multiplexing, if the resulting PUCCH overlaps with the LP PUSCH in time domain resource (for example, the resulting PUCCH is multiplexed onto the HP HARQ-ACK PUCCH), the terminal can multiplex all or part of UCIs onto the LP PUSCH. For example, the terminal can multiplex HP SR, HP HARQ-ACK, and LP HARQ-ACK onto the LP PUSCH, and drops LP CSI.

Optionally, the terminal can handle the overlapping between uplink channels shown in FIG. 4 according to another manner, for example, according to the starting time of PUCCH and PUSCH, or according to the type of uplink channel, or according to configuration information of a network-side device. For a specific handling manner, reference may be made to the foregoing Embodiment 1, and details are not described herein again.

In the embodiments of this application, in a case that uplink channels of different priorities overlap in time domain resource, a terminal can handle the overlapping between uplink channels according to a preset rule, and then transmit overlap-handled uplink channels, so as to reduce impact on service priorities and avoid destroying the single-carrier characteristic of uplink transmission of the terminal, thereby guaranteeing uplink channel transmission performance and improving system efficacy and system efficiency.

It should be noted that the uplink channel transmission method provided in the embodiments of this application may be performed by an uplink channel transmission apparatus or a control module for performing the uplink channel transmission method in the uplink channel transmission apparatus. The uplink channel transmission method being performed by an uplink channel transmission apparatus is used as an example in the embodiments of this application for describing the uplink channel transmission method provided in the embodiments of this application.

Figure 5:
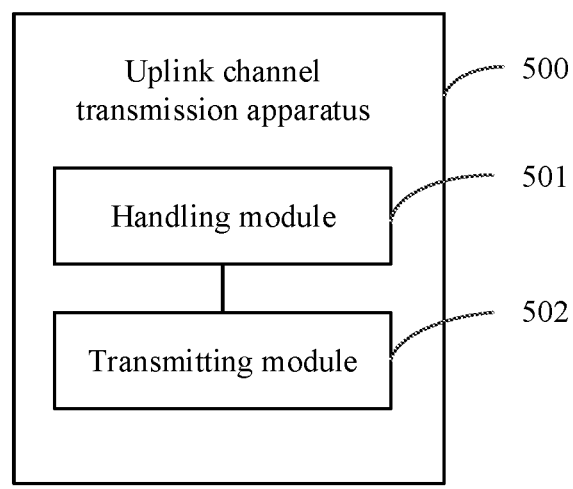
FIG. 5 is a structural diagram of an uplink channel transmission apparatus according to an embodiment of this application.

Refer to FIG. 5, which is a structural diagram of an uplink channel transmission apparatus according to an embodiment of this application. As shown in FIG. 5, the uplink channel transmission apparatus 500 includes:

a handling module 501, configured to: in a case of uplink channel overlapping in time domain resource, handle the overlapping between uplink channels according to a preset rule; and a transmitting module 502, configured to transmit overlap-handled uplink channels.

The uplink channels overlapping in time domain resource include uplink channels of different priorities, and the preset rule is associated with at least one of the following:

priority of uplink channel;
type of uplink channel;
starting time of uplink channel;
configuration of uplink channel;
capability of the uplink channel transmission apparatus; or
configuration information transmitted by a network-side device, where the configuration information is used to indicate an order of handling overlapping of uplink channel transmissions.

Optionally, in a case that the preset rule is associated with the priority of uplink channel, the handling module is further configured to:

handle preferentially overlapping between uplink channels of a same priority and handle later overlapping between uplink channels of different priorities.

Optionally, the handling module is further configured to:
handle preferentially overlapping between physical uplink control channels PUCCHs of a same priority and handle later overlapping between PUCCH and physical uplink shared channel PUSCH of a same priority.

Optionally, the handling module is further configured to:
handle preferentially overlapping between PUCCHs of different priorities and handle later overlapping between PUCCH and PUSCH of different priorities.

Optionally, in a case that the preset rule is associated with the priority of uplink channel and the type of uplink channel, the handling module is further configured to:

handle preferentially overlapping between PUCCHs of a same priority, handle later overlapping between PUCCHs of different priorities, and handle even later overlapping between PUCCH and PUSCH of a same priority; or handle preferentially overlapping between PUCCHs of a same priority, handle later overlapping between PUCCHs of different priorities, and handle even later overlapping between PUCCH and PUSCH of different priorities; or handle preferentially overlapping between PUCCHs of a same priority, handle later overlapping between PUCCHs of different priorities, and handle even later overlapping between PUCCH and PUSCH.

Optionally, in a case that the preset rule is associated with the type of uplink channel, the handling module is further configured to:

handle preferentially overlapping between PUCCHs and handle later overlapping between PUCCH and PUSCH.

Optionally, in a case that the preset rule is associated with the starting time of uplink channel, the handling module is further configured to:

handle preferentially overlapping between uplink channels of earlier starting time and handle later overlapping between uplink channels of later starting time.

The starting time includes a starting symbol and/or starting time unit of uplink channel.

Optionally, in a case that the preset rule is associated with the configuration of uplink channel, the handling module is further configured to:

handle preferentially overlapping between configured uplink channels and handle later overlapping between configured uplink channel and dynamically scheduled uplink channel; or handle preferentially overlapping between configured uplink channels and handle later overlapping between dynamically scheduled uplink channels.

Optionally, the handling module is further configured to perform at least one of the following:

in a case of overlapping between PUCCHs, multiplexing the overlapping PUCCHs onto one PUCCH; or in a case of overlapping between PUCCH and PUSCH, multiplexing at least part of uplink control information UCI carried on each of the PUCCH onto at least one of the PUSCH.

In a case that uplink channels of different priorities overlap in time domain resource, the uplink channel transmission apparatus 500 provided in this embodiment of this application can handle the overlapping between uplink channels according to a preset rule, and then transmit overlap-handled uplink channels, so as to reduce impact on service priorities and avoid destroying the single-carrier characteristic of uplink transmission, thereby guaranteeing uplink channel transmission performance and improving system efficacy and system efficiency.

The uplink channel transmission apparatus 500 in this embodiment of this application may be an apparatus, or may be a component, integrated circuit, or chip in a terminal. The apparatus may be a mobile terminal or may be a non-mobile terminal. For example, the mobile terminal may include but is not limited to the foregoing listed types of the terminal 11, and the non-mobile terminal may be a server, a network attached storage (NAS), a personal computer (PC), a television (TV), a teller machine, a self-service machine, or the like. This is not specifically limited in the embodiments of this application.

The uplink channel transmission apparatus 500 in this embodiment of this application may be an apparatus with an operating system. The operating system may be an Android operating system, an iOS operating system, or other possible operating systems. This is not specifically limited in the embodiments of this application.

The uplink channel transmission apparatus 500 provided in the embodiments of this application can implement the processes that are implemented in the method embodiments of FIG. 2 and FIG. 4, with the same technical effects achieved. To avoid repetition, details are not described herein again.

Figure 6:
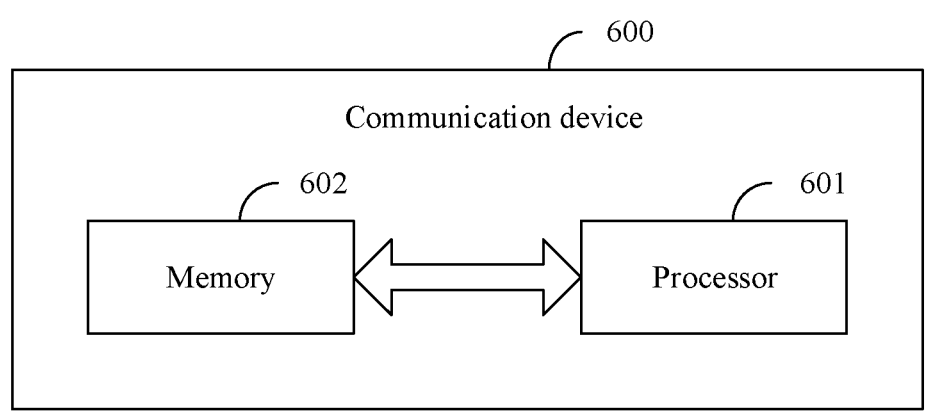
FIG. 6 is a structural diagram of a communication device according to an embodiment of this application.

Optionally, as shown in FIG. 6, an embodiment of this application further provides a communication device 600, including a processor 601, a memory 602, and a program or instructions stored in the memory 602 and capable of running on the processor 601. For example, the communication device 600 is a terminal, and when the program or instructions are executed by the processor 601, the processes of the foregoing embodiments of the uplink channel transmission method are implemented, with the same technical effects achieved. To avoid repetition, details are not described herein again.

Figure 7:
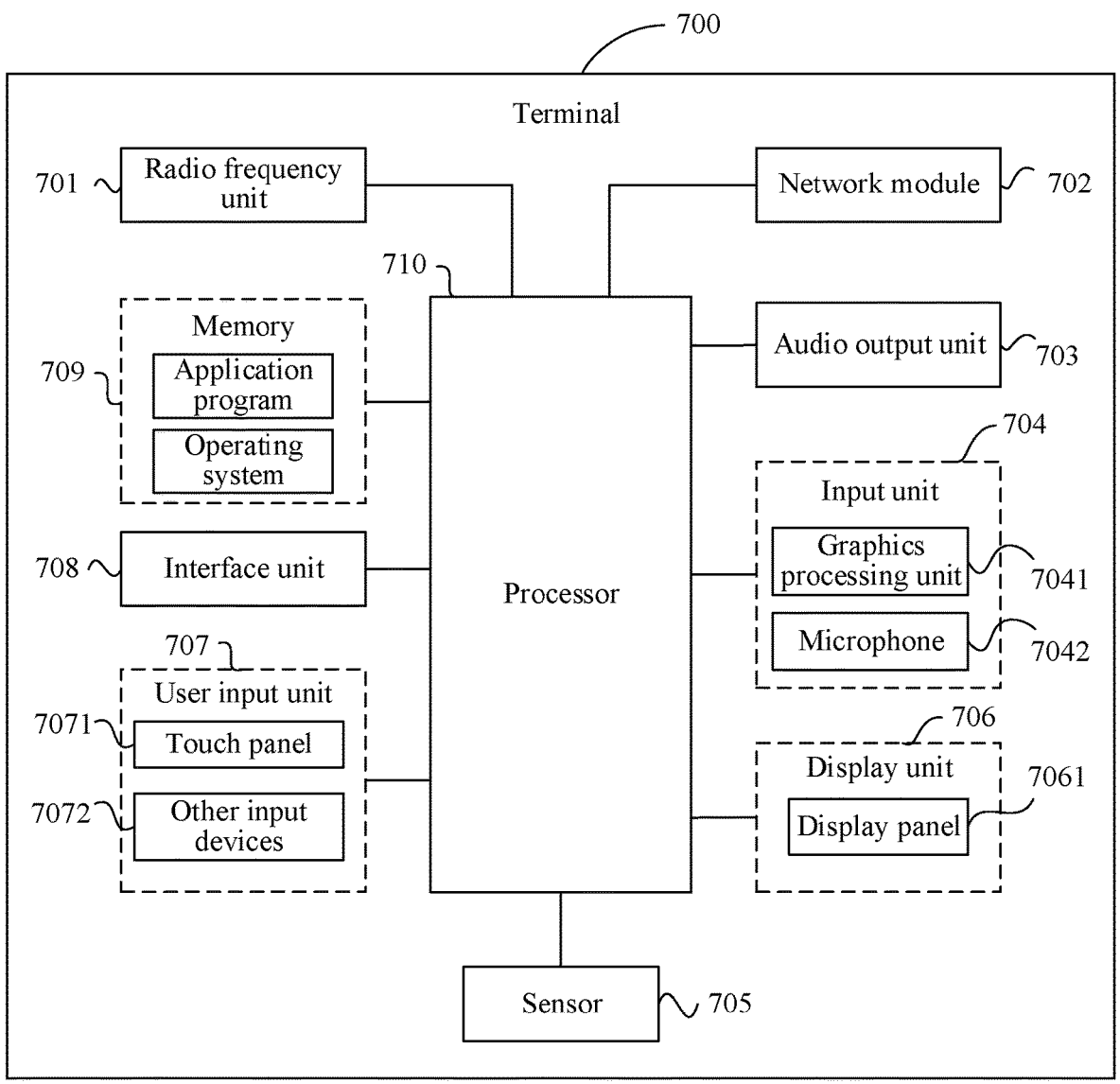
FIG. 7 is a structural diagram of a terminal according to an embodiment of this application.

FIG. 7 is a schematic diagram of a hardware structure of a terminal implementing the embodiments of this application.

The terminal 700 includes but is not limited to components such as a radio frequency unit 701, a network module 702, an audio output unit 703, an input unit 704, a sensor 705, a display unit 706, a user input unit 707, an interface unit 708, a memory 709, and a processor 710.

Persons skilled in the art can understand that the terminal 700 may further include a power supply (such as a battery) for supplying power to the components. The power supply may be logically connected to the processor 710 via a power management system. In this way, functions such as charge management, discharge management, and power consumption management are implemented via the power management system. The terminal structure shown in FIG. 7 does not constitute any limitation on the terminal. The terminal may include more or fewer components than shown in the figure, or combine some of the components, or have different arrangements of the components. Details are not described herein again.

It should be understood that in this embodiment of this application, the input unit 704 may include a graphics processing unit (GPU) 7041 and a microphone 7042. The graphics processing unit 7041 processes image data of a static picture or a video that is obtained by an image capture apparatus (for example, a camera) in an image capture mode or a video capture mode. The display unit 706 may include a display panel 7061, and the display panel 7061 may be configured in a form of a liquid crystal display, an organic light-emitting diode display, or the like. The user input unit 707 includes a touch panel 7071 and other input devices 7072. The touch panel 7071 is also referred to as a touchscreen. The touch panel 7071 may include two parts: a touch detection apparatus and a touch controller. The other input devices 7072 may include but are not limited to a physical keyboard, a functional button (such as a volume control button or a power on/off button), a trackball, a mouse, and a joystick. Details are not described herein.

In this embodiment of this application, the radio frequency unit 701 sends downlink data received from a network-side device to the processor 710 for processing, and in addition, sends uplink data to the network-side device. Generally, the radio frequency unit 701 includes but is not limited to an antenna, at least one amplifier, a transceiver, a coupler, a low noise amplifier, and a duplexer.

The memory 709 may be configured to store software programs or instructions and various data. The memory 709 may mainly include a program or instruction storage area and a data storage area. The program or instruction storage area may store an operating system, an application program or instructions required by at least one function (for example, a sound play function or an image play function), and the like. In addition, the memory 709 may include a high-speed random access memory, and may further include a non-volatile memory. The non-volatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory, for example, at least one disk storage device, flash memory device, or other non-volatile solid-state storage device.

The processor 710 may include one or more processing units. Optionally, the processor 710 may integrate an application processor and a modem processor. The application processor mainly processes an operating system, a user interface, application programs or instructions, or the like. The modem processor mainly processes wireless communication, for example, a baseband processor. It can be understood that the modem processor may alternatively be not integrated in the processor 710.

The processor 710 is configured to: in a case of uplink channel overlapping in time domain resource, handle the overlapping between uplink channels according to a preset rule.

The radio frequency unit 701 is configured to transmit overlap-handled uplink channels.

The uplink channels overlapping in time domain resource include uplink channels of different priorities, and the preset rule is associated with at least one of the following:
  priority of uplink channel;
  type of uplink channel;
  starting time of uplink channel;
  configuration of uplink channel;
  capability of the terminal; or
  configuration information transmitted by a network-side device, where the configuration information is used to indicate an order of handling overlapping of uplink channel transmissions.

Optionally, in a case that the preset rule is associated with the priority of uplink channel, the processor 710 is further configured to:
  handle preferentially overlapping between uplink channels of a same priority and handle later overlapping between uplink channels of different priorities.

Optionally, the processor 710 is further configured to:
  handle preferentially overlapping between physical uplink control channels PUCCHs of a same priority and handle later overlapping between PUCCH and physical uplink shared channel PUSCH of a same priority.

Optionally, the processor 710 is further configured to:
  handle preferentially overlapping between PUCCHs of different priorities and handle later overlapping between PUCCH and PUSCH of different priorities.

Optionally, in a case that the preset rule is associated with the priority of uplink channel and the type of uplink channel, the processor 710 is further configured to:
  handle preferentially overlapping between PUCCHs of a same priority, handle later overlapping between PUCCHs of different priorities, and handle even later overlapping between PUCCH and PUSCH of a same priority; or
  handle preferentially overlapping between PUCCHs of a same priority, handle later overlapping between PUCCHs of different priorities, and handle even later overlapping between PUCCH and PUSCH of different priorities; or
  handle preferentially overlapping between PUCCHs of a same priority, handle later overlapping between PUCCHs of different priorities, and handle even later overlapping between PUCCH and PUSCH.

Optionally, in a case that the preset rule is associated with the type of uplink channel, the processor 710 is further configured to:

handle preferentially overlapping between PUCCHs and handle later overlapping between PUCCH and PUSCH.

Optionally, in a case that the preset rule is associated with the starting time of uplink channel, the processor 710 is further configured to:

handle preferentially overlapping between uplink channels of earlier starting time and handle later overlapping between uplink channels of later starting time.

The starting time includes a starting symbol and/or starting time unit of uplink channel.

Optionally, in a case that the preset rule is associated with the configuration of uplink channel, the processor 710 is further configured to:

handle preferentially overlapping between configured uplink channels and handle later overlapping between configured uplink channel and dynamically scheduled uplink channel; or handle preferentially overlapping between configured uplink channels and handle later overlapping between dynamically scheduled uplink channels.

Optionally, the processor 710 is further configured to perform at least one of the following:

in a case of overlapping between PUCCHs, multiplexing the overlapping PUCCHs onto one PUCCH; or in a case of overlapping between PUCCH and PUSCH, multiplexing at least part of uplink control information UCI carried on each of the PUCCH onto at least one of the PUSCH.

In the embodiments of this application, in a case that uplink channels of different priorities overlap in time domain resource, the terminal 700 can handle the overlapping between uplink channels according to a preset rule, and then transmit overlap-handled uplink channels, so as to reduce impact on service priorities and avoid destroying the single-carrier characteristic of uplink transmission of the terminal, thereby guaranteeing uplink channel transmission performance and improving system efficacy and system efficiency.

An embodiment of this application further provides a readable storage medium, where the readable storage medium stores a program or instructions, and when the program or instructions are executed by a processor, the processes of the foregoing embodiments of the uplink channel transmission method are implemented, with the same technical effects achieved. To avoid repetition, details are not described herein again.

The processor is the processor in the terminal in the foregoing embodiments. The readable storage medium includes a computer-readable storage medium such as a computer read-only memory (ROM), a random access memory (RAM), a magnetic disk, or an optical disc.

An embodiment of this application further provides a chip, where the chip includes a processor and a communication interface, the communication interface is coupled to the processor, and the processor is configured to run a program or instructions of a network-side device to implement the processes of the foregoing embodiments of the uplink channel transmission method, with the same technical effects achieved. To avoid repetition, details are not described herein again.

It should be understood that the chip mentioned in this embodiment of this application may also be referred to as a system-level chip, a system chip, a chip system, a system-on-chip, or the like.

It should be noted that, in this specification, the terms "include", "comprise", or any of their variants are intended to cover a non-exclusive inclusion, such that a process, method, article, or apparatus that includes a series of elements not only includes those elements but also includes other elements that are not expressly listed, or further includes elements inherent to such process, method, article, or apparatus. In the absence of more restrictions, an element preceded by the statement "includes a . . . " does not preclude the existence of other identical elements in the process, method, article, or apparatus that includes the element. In addition, it should be noted that the scopes of the method and apparatus in the implementations of this application are not limited to performing functions in the order shown or discussed, but may further include performing functions at substantially the same time or in a reverse order depending on the functions involved. For example, the described method may be performed in an order different from the order described, and steps may be added, omitted, or combined. In addition, features described with reference to some examples may be combined in other examples.

From the foregoing description of the implementations, persons skilled in the art can clearly understand that the method in the foregoing embodiments may be implemented by software with a necessary general hardware platform. Certainly, the method in the foregoing embodiments may alternatively be implemented by hardware. However, in many cases, the former is a example implementation. Based on such an understanding, the technical solutions of this application essentially or the part contributing to the prior art may be implemented in a form of a software product. The computer software product is stored in a storage medium (for example, ROM/RAM, a magnetic disk, or an optical disc), and includes several instructions for instructing a terminal (which may be a mobile phone, a computer, a server, an air conditioner, a network device, or the like) to perform the method described in the embodiments of this application.

The foregoing describes the embodiments of this application with reference to the accompanying drawings. However, this application is not limited to the foregoing specific implementations. The foregoing specific implementations are merely illustrative rather than restrictive. As instructed by this application, persons of ordinary skill in the art may develop many other forms that do not depart from the essence of this application and the protection scope of the claims, and all such forms shall fall within the protection scope of this application.

What is claimed is:

1. An uplink channel transmission method, comprising:
in a case of uplink channel overlapping in time domain resource, handling, by a terminal, the overlapping between uplink channels according to a preset rule; and
transmitting, by the terminal, overlap-handled uplink channels; wherein
the uplink channels overlapping in time domain resource comprise uplink channels of different priorities, and the preset rule is associated with
priority of uplink channel and
type of uplink channel;
wherein in a case that the preset rule is associated with the priority of uplink channel, the handling the overlapping between uplink channels according to a preset rule comprises:
handling preferentially overlapping between uplink channels of a same priority and handling later overlapping between uplink channels of different priorities;
wherein the handling preferentially overlapping between uplink channels of a same priority comprises:

handling preferentially overlapping between physical uplink control channels PUCCHs of a same priority and handling later overlapping between PUCCH and physical uplink shared channel PUSCH of a same priority; wherein the PUCCH is a PUCCH obtained from that overlapping of the PUCCHs of the same priority has been handled, and the PUSCH has a same priority as the PUCCHs;

wherein the handling later overlapping between uplink channels of different priorities comprises:

handling preferentially overlapping between PUCCHs of different priorities and handling later overlapping tween PUCCH and PUSCH of different priorities; wherein the PUCCHs of different priorities are PUCCHs obtained from that overlapping of the PUCCHs of the same priority has been handled.

2. The method according to claim 1, wherein the handling the overlapping between uplink channels according to a preset rule comprises:

handling preferentially overlapping between PUCCHs of a same priority, handling later overlapping between PUCCHs of different priorities, and handling even later overlapping between PUCCH and PUSCH of different priorities.

3. The method according to claim 1, wherein in a case that the preset rule is associated with the type of uplink channel, the handling the overlapping between uplink channels according to a preset rule comprises:

handling preferentially overlapping between PUCCHs and handling later overlapping between PUCCH and PUSCH.

4. The method according to claim 1, wherein the preset rule is further associated with starting time of uplink channel, the handling the overlapping between uplink channels according to a preset rule comprises:

handling preferentially overlapping between uplink channels of earlier starting time and handling later overlapping between uplink channels of later starting time; wherein the starting time comprises a starting symbol and/or starting time unit of uplink channel.

5. The method according to claim 1, wherein the preset rule is further associated with the configuration of uplink channel, the handling the overlapping between uplink channels according to a preset rule comprises:

handling preferentially overlapping between configured uplink channels and handling later overlapping between configured uplink channel and dynamically scheduled uplink channel; or handling preferentially overlapping between configured uplink channels and handling later overlapping between dynamically scheduled uplink channels.

6. The method according to claim 1, wherein the handling the overlapping between uplink channels comprises at least one of the following:

in a case of overlapping between PUCCHs, multiplexing the overlapping PUCCHs onto one PUCCH; or in a case of overlapping between PUCCH and PUSCH, multiplexing at least part of uplink control information UCI carried on each of the PUCCH onto at least one of the PUSCH.

7. The method according to claim 1, wherein the priority of uplink channel is represented by a priority index.

8. A terminal, comprising a processor, a memory, and a program or instructions stored in the memory and capable of running on the processor, wherein when the program or instructions are executed by the processor, the steps of an uplink channel transmission method are implemented, wherein the uplink channel transmission method comprises:

in a case of uplink channel overlapping in time domain resource, handling, by a terminal, the overlapping between uplink channels according to a preset rule; and transmitting, by the terminal, overlap-handled uplink channels; wherein the uplink channels overlapping in time domain resource comprise uplink channels of different priorities, and the preset rule is associated priority of uplink channel and type of uplink channel;

wherein in a case that the preset rule is associated with the priority of uplink channel, the handling the overlapping between uplink channels according to a preset rule comprises:

handling preferentially overlapping between uplink channels of a same priority and handling later overlapping between uplink channels of different priorities;

wherein the handling preferentially overlapping between uplink channels of a same priority comprises:

handling preferentially overlapping between physical uplink control channels PUCCHs of a same priority and handling later overlapping between PUCCH and physical uplink shared channel PUSCH of a same priority; wherein the PUCCH is a PUCCH obtained from that overlapping of the PUCCHs of the same priority has been handled, and the PUSCH has a same priority as the PUCCHs;

wherein the handling later overlapping between uplink channels of different priorities comprises:

handling preferentially overlapping between PUCCHs of different priorities and handling later overlapping tween PUCCH and PUSCH of different priorities; wherein the PUCCHs of different priorities are PUCCHs obtained from that overlapping of the PUCCHs of the same priority has been handled.

9. The terminal according to claim 8, wherein the handling the overlapping between uplink channels according to a preset rule comprises:

handling preferentially overlapping between PUCCHs of a same priority, handling later overlapping between PUCCHs of different priorities, and handling even later overlapping between PUCCH and PUSCH of different priorities.

10. The terminal according to claim 8, wherein in a case that the preset rule is associated with the type of uplink channel, the handling the overlapping between uplink channels according to a preset rule comprises:

handling preferentially overlapping between PUCCHs and handling later overlapping between PUCCH and PUSCH.

11. The terminal according to claim 8, wherein the preset rule is further associated the starting time of uplink channel, the handling the overlapping between uplink channels according to a preset rule comprises:

handling preferentially overlapping between uplink channels of earlier starting time and handling later overlapping between uplink channels of later starting time; wherein the starting time comprises a starting symbol and/or starting time unit of uplink channel.

12. The terminal according to claim 8, wherein the preset rule is further associated with the configuration of uplink channel, the handling the overlapping between uplink channels according to a preset rule comprises:

handling preferentially overlapping between configured uplink channels and handling later overlapping between configured uplink channel and dynamically scheduled uplink channel; or handling preferentially overlapping between configured uplink channels and handling later overlapping between dynamically scheduled uplink channels.

13. The terminal according to claim 8, wherein the handling the overlapping between uplink channels comprises at least one of the following:

in a case of overlapping between PUCCHs, multiplexing the overlapping PUCCHs onto one PUCCH; or in a case of overlapping between PUCCH and PUSCH, multiplexing at least part of uplink control information UCI carried on each of the PUCCH onto at least one of the PUSCH.

14. The terminal according to claim 8, wherein the priority of uplink channel is represented by a priority index.

15. A non-transitory readable storage medium, wherein the non-transitory readable storage medium stores a program or instructions, and when the program or instructions are executed by a processor, the steps of an uplink channel transmission method are implemented, wherein the uplink channel transmission method comprises:

in a case of uplink channel overlapping in time domain resource, handling, by a terminal, the overlapping between uplink channels according to a preset rule; and transmitting, by the terminal, overlap-handled uplink channels; wherein the uplink channels overlapping in time domain resource comprise uplink channels of different priorities, and the preset rule is associated with at least one of the following:

priority of uplink channel and type of uplink channel;

wherein in a case that the preset rule is associated with the priority of uplink channel, the handling the overlapping between uplink channels according to a preset rule comprises:

handling preferentially overlapping between uplink channels of a same priority and handling later overlapping between uplink channels of different priorities;

wherein the handling preferentially overlapping between uplink channels of a same priority comprises:

handling preferentially overlapping between physical uplink control channels PUCCHs of a same priority and handling later overlapping between PUCCH and physical uplink shared channel PUSCH of a same priority; wherein the PUCCH is a PUCCH obtained from that overlapping of the PUCCHs of the same priority has been handled, and the PUSCH has a same priority as the PUCCHs;

wherein the handling later overlapping between uplink channels of different priorities comprises:

handling preferentially overlapping between PUCCHs of different priorities and handling later overlapping tween PUCCH and PUSCH of different priorities; wherein the PUCCHs of different priorities are PUCCHs obtained from that overlapping of the PUCCHs of the same priority has been handled.

16. The non-transitory readable storage medium according to claim 15, wherein the priority of uplink channel is represented by a priority index.

* * * * *